US008220321B2

(12) United States Patent
Koivunen

(10) Patent No.: US 8,220,321 B2
(45) Date of Patent: Jul. 17, 2012

(54) METHOD AND APPARATUS FOR TESTING THE PISTON OF AN INJECTION PUMP

(75) Inventor: Matti Koivunen, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 78 days.

(21) Appl. No.: 12/811,569

(22) PCT Filed: Dec. 12, 2008

(86) PCT No.: PCT/FI2008/050731
§ 371 (c)(1), (2), (4) Date: Sep. 10, 2010

(87) PCT Pub. No.: WO2009/083641
PCT Pub. Date: Jul. 9, 2009

(65) Prior Publication Data

US 2010/0326176 A1 Dec. 30, 2010

(30) Foreign Application Priority Data

Jan. 2, 2008 (FI) .................................... 20085003

(51) Int. Cl.
*G01M 15/00* (2006.01)

(52) U.S. Cl. .................................................... 73/114.41

(58) Field of Classification Search .......... 73/40, 114.41
See application file for complete search history.

(56) References Cited

U.S. PATENT DOCUMENTS 3,026,723 A * 3/1962 Cief .......................... 73/114.41
3,371,521 A 3/1968 Hauk
4,665,742 A 5/1987 Abt et al.
4,811,252 A * 3/1989 Furuse ........................... 702/51
5,795,995 A 8/1998 Shimaoka et al.
6,321,590 B1 * 11/2001 Matsumura ...................... 73/40
7,316,153 B2 * 1/2008 Winkler et al. .................. 73/40
2006/0179921 A1 8/2006 Winkler et al.

FOREIGN PATENT DOCUMENTS

DE 40 35 739 A1 5/1992
DE 10 2006 014269 A1 10/2007
GB 1078770 8/1967
GB 2 237 074 A 4/1991
JP 2000-145592 5/2000
WO WO 89/10479 A 11/1989
WO WO 02/086437 10/2002

* cited by examiner

*Primary Examiner* — Freddie Kirkland, III
(74) *Attorney, Agent, or Firm* — Muncy, Geissler, Olds & Lowe, PLLC

(57) ABSTRACT

A method and an apparatus for testing the piston (2) of an injection pump of a pressure medium, the piston comprising a longitudinal groove (2*b*) that begins from its frontal face (2*a*) and extends on its side, and a screw-shaped guide edge (2*c*) that abuts on the envelope surface of the piston. According to the invention, the piston (2) is inserted, with its frontal face (2*a*) first, into a testing cylinder (1), wherein the clearance between the piston (2) and the testing cylinder (2) is tight and wherein a specific testing pressure is exerted on the envelope surface of the piston, in a limited area, from the vicinity of the said guide edge (2*c*) to a selected measurement point. The piston (2) is moved in the testing cylinder (1), so that the said measurement point moves, following the guide edge (2*c*). Changes in the testing pressure are monitored to observe any failures in the piston (2) and the said guide edge (2*c*).

16 Claims, 2 Drawing Sheets

2
A
1
2d
B
2c
4
B
2b
3
2a
5
3 bar
1-2,5 bar

A
1
2
2d
2c
4
B
B
2b
3
2a
5
3 bar
1-2,5 bar

A
2
2e
2e
2c
2d
1
2b
2c
4
3

2c
2b
2
5
2a

METHOD AND APPARATUS FOR TESTING THE PISTON OF AN INJECTION PUMP

BACKGROUND OF THE INVENTION

1. Field of the Invention

The invention relates to a method of testing the piston of an injection pump of a pressure medium, the piston comprising a longitudinal groove on its side, starting from its frontal face, and a screw-shaped guide edge that abuts on the envelope surface of the piston. The invention also relates to a testing apparatus for testing the piston of the injection pump of the pressure medium.

2. Description of the Related Art

The pump element of the injection pump is comprised of a piston and a cylinder, as is well-known. Injection pumps are used for feeding fuel in combustion engines, in particular. The pressures employed are high; therefore, the clearance between the piston and the cylinder is only a few microns. Hence, the tightness and its endurance have an essential impact on the flawless operation of the injection pump.

One problem encountered with injection pumps comprises the cavitation damages in the piston of the injection pump. At first, these generally appear on the envelope surface of the piston, which as such does not affect the operation of the injection pump. Before long, the cavitation damages may also extend to the guide edge of the piston, whereby they have a direct effect on the operation of the injection pump. Such failures due to the cavitation damages and their effect on the operation of the injection pump have previously been difficult to assess and measure.

BRIEF SUMMARY OF THE INVENTION

The purpose of the invention is to provide a new method and an apparatus for the application of the method, by means of which the condition of the injection pump and, particularly, any cavitation damages that have adverse effects on the operation of the injection pump, can easily and reliably be discovered. In particular, the purpose of the invention is to make it possible to analyze and test the condition of the guide edge of the injection pump piston, so that the fitness for operation of the pump can reliably be checked and determined early enough.

According to the invention, the piston is inserted, with its frontal face first, into a testing cylinder, wherein the clearance between the piston and the testing cylinder is tight and wherein a specific testing pressure is exerted on the envelope surface of the piston, in a limited area, from the vicinity of the said guide edge to a selected measurement point. After this, the piston is moved in the testing cylinder so that the said measurement point moves, following the guide edge. At the same time, changes in the testing pressure are monitored to observe any failures in the piston and the said guide edge.

In practice, the clearance between the piston and the testing cylinder is in the order of a few thousandths of a millimeter, corresponding to the clearances commonly used in actual injection pumps.

Testing is initiated from the vicinity of a transversal surface connected to the end that is opposite to the frontal face of the guide edge, wherein a reference value is taken for monitoring changes in the testing pressure. In this way, right at the beginning, a reference value suitable to the piston being tested, respectively, is easily obtained, since there are generally no damages in this point of the piston.

Feeding of a steady testing pressure is continued and the pressure values of the respective measurement points are compared with the reference value, whereby a specific decrease in the pressure values of the pressure gauge that is connected to the feeding, compared with the reference value, such as 0.2 bar or more, indicates a failure in the guide edge.

The testing medium is most preferably air and the testing pressure is in the order of 3-4 bar.

In practice, the testing is preferably implemented, throughout the guide edge of the piston, so that the piston is rotated and, simultaneously, an axial force of the piston is exerted on its frontal face. Furthermore, in the testing cylinder, a counterforce is arranged for the said axial force, being supported by the said guide edge. In this way, the piston to be tested and its movements can be continuously controlled by means of the said forces.

The invention further relates to a testing apparatus for testing the piston of the injection pump of the pressure medium, which can be used to apply the method described above in practice. According to the invention, the testing apparatus includes a testing cylinder, into which the piston is arranged to be inserted with its frontal face first, and the clearance of which with the piston is tight. The testing cylinder is provided with pressure medium feeding equipment for exerting a testing pressure on an area that abuts on the envelope surface of the piston, from the vicinity of the guide edge of the piston to the selected measuring point, pressure measuring instruments for following the changes in the testing pressure in the piston and for observing any failures in the said guide edge, and means for moving the piston in the testing cylinder so that the said measurement point moves, following the guide edge.

The pressure medium feeding equipment includes means for keeping the feeding pressure as steady as possible.

The testing cylinder comprises a pin or the like in the radial direction, which extends to the piston to be tested and which is arranged so as to cooperate with the guide edge of the piston, so that the piston is arranged to be pushed by means of the guide edge against the said pin or the like. The said pin or the like is situated at a distance from the said measurement point, in the transversal direction of the testing cylinder. In the case of a piston that comprises two similar guide edges on different sides of the piston, the pin is preferably placed on the opposite side of the testing cylinder with respect to the measurement point.

By placing the said pin or the like, in the axial direction of the testing cylinder, somewhat farther away from the frontal face of the piston to be tested than the said measurement point, it is ensured that, on the one hand, the measurement point is in the vicinity of the guide edge of the piston but, on the other hand, sufficiently far from the same. Depending on the handedness of the piston, the testing cylinder is also preferably provided with a separate boring that is arranged on either side of the pin on the same cross-sectional plane with it, which boring is situated next to the recess connected to the guide edge of the piston. In this way, any testing pressure leaking through a possible damaged point in the guide edge of the piston can be discharged from the testing cylinder in a controlled manner.

The said force that is exerted on the frontal face is preferably provided pneumatically.

In the following, the invention is described by way of examples and with reference to the appended schematic drawings, in which

DETAILED DESCRIPTION OF THE INVENTION

Figure 1:
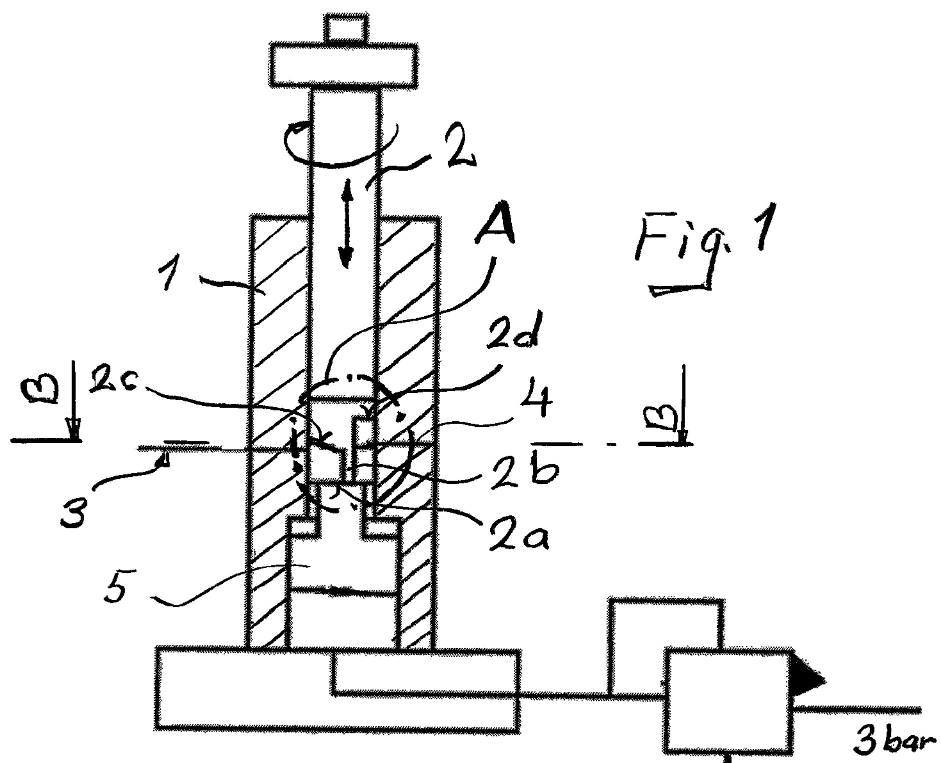
FIG. 1 shows a cutaway basic view of an embodiment of the testing apparatus according to the invention.

The reference number 1 in the drawing refers to the testing cylinder of the testing apparatus, into which the piston 2 of the injection pump is inserted with its frontal face 2*a* first, with a tight fit, which in practice is in the order of a few microns, most preferably 6-22 microns, depending on the type of pump. In the piston according to this application example, there are two longitudinal grooves 2*b* in a symmetrical relationship, and their associated screw-shaped guide edges 2*c*, which end in even transversal surfaces 2*d*, as shown in detail in FIG. 2. The guide edges 2*c*, for their part, also define a recess 2*e* in the piston 2 (cf. FIG. 2), through which the feeding pressures in the injection pump are discharged.

Figure 3:
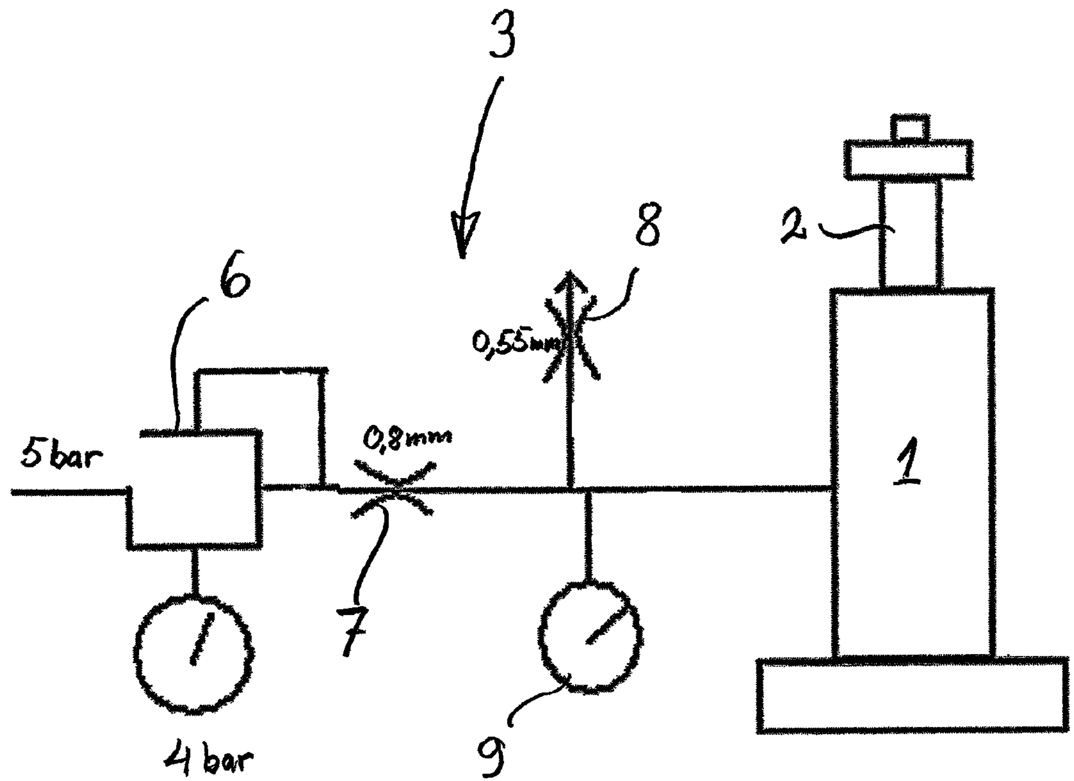
FIG. 3 shows a basic view of the pneumatic arrangement of the force that is exerted on the piston to be tested.

The testing cylinder 1 is provided with pressure medium feeding equipment 3, which is shown in detail in FIG. 3, and a pin 4 that extends to the piston 2 to be tested, which pin is placed farther away from the frontal face 2*a* than the measurement point that is related to the pressure medium feeding equipment 3. In this way, it is ensured that the measurement point is suitably situated in the vicinity of the guide edge 2*c*. During testing, the pin 4 extends somewhat inside the testing cylinder 1 and into the recess 2*e* so that, according to the circumstances, it cooperates with the longitudinal groove 2*b* and the guide edge 2*c*.

Furthermore, the testing cylinder 1 is provided with a pneumatic piston 5, which pushes the piston 2 to be tested towards the pin 4. A pneumatic control circuit with accessories is shown in FIG. 1, and the pneumatic pressure is adjustable, as required, so that the air pressure under the piston 5 works like an air spring. Furthermore, the testing cylinder 1 is provided with equipment (not shown in detail), by means of which the piston 2 can be rotated either clockwise or counter-clockwise, according to the respective circumstances.

The pressure medium feeding equipment 3 is arranged to feed air to the measurement point at a steady pressure. According to FIG. 3, the pressure that is fed into the control unit 6 is about 5 bar. After the control unit 6, there is a 0.8-mm throttle 7, and a 0.55-mm throttle 8 that leads out of the connection that leads to the measurement point. Furthermore, the equipment includes a pressure gauge 9, which is placed in the connection that leads to the measurement point after the throttle 8.

Referring to the figures, the testing of the piston 2 of the injection pump in the testing cylinder 1 is carried out as follows. The piston 2 and its frontal face 2*a* are conveyed against the pneumatic piston 5, so that the pin 4 is situated next to the longitudinal groove 2*b*. By pushing the piston 2 further downwards in FIG. 1, and then by slightly rotating it, the pin 4 is conveyed to the transversal surface 2*d* along the longitudinal groove 2*b*, whereby the piston 2 is against the pin 4, pushed by the pneumatic piston 5 and through the intermediary of the transversal surface 2*d*. At this point, a specific steady testing pressure, such as 3-4 bar, is exerted by the pressure medium feeding equipment 3 on the measurement point on the envelope surface of the piston 2 in the vicinity of the guide edge 2*c*. This value is used as a reference value, since there are typically no damages in this point of the piston 2 of the injection pump.

Figure 2:
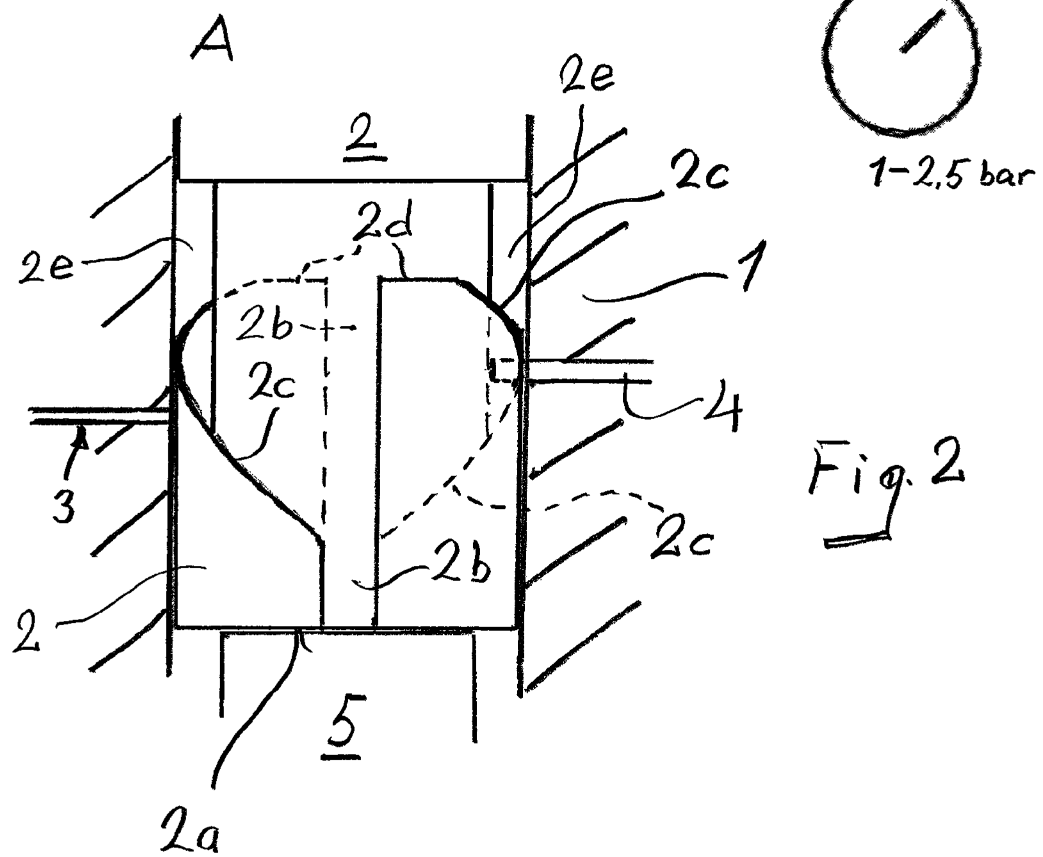
FIG. 2 shows the enlargement A of FIG. 1.

After this, the piston 2 is rotated clockwise in the case of the figures, whereby the pin 4 begins to slide along the guide edge 2*c*. In the case of another handedness of the piston 2, the rotation is naturally carried out counter-clockwise. The piston 2 then moves upwards in FIG. 1, still under a strict control, between the pin 4 and the pneumatic piston 5. At the same time, the measurement point also moves, following the guide edge 2*c*, as shown in FIG. 2, and a steady pressure is continuously exerted on the measurement point and monitored by the pressure gauge 9. Depending on the respective piston 2 and the clearance, the values of the pressure gauge are then normally in the order of 3.3-3.7 bar, when the piston 2 is in order. If the pressure now drops a specific amount compared with the reference value, such as 0.2 bar or more, it indicates a damage on the envelope surface of the piston, extending beyond the guide edge 2*c*. This procedure is continued, until the entire guide edge 2*c* has been examined. Correspondingly, in the case of the figures, the condition of the other guide edge 2*c* in the piston can also be tested.

Figure 4:
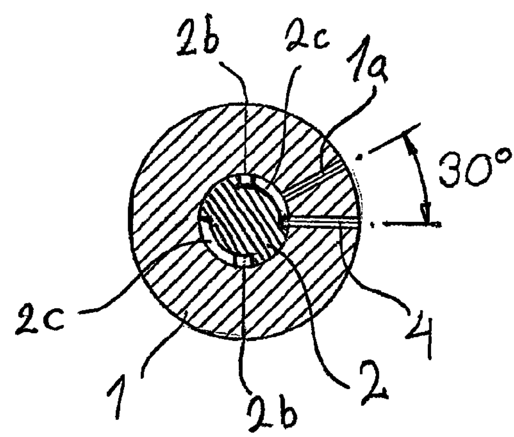
FIG. 4 shows the section B-B of FIG. 1.

Depending on the handedness of the piston 2, the testing cylinder 1 is also provided with a separate boring 1*a* (cf. FIG. 4), which is arranged on either side of the pin 4 on the same cross-sectional plane with it, and which is situated next to the recess 2*e* connected to the guide edge 2*c* of the piston, and through which the testing pressure that leaks through a possible damaged point of the guide edge 2*c* can be discharged without problems.

For the various types of pistons of the injection pump, testing cylinders of their own are required, wherein the measurement point and the location of the pin 4 must be placed according to the respective circumstances. Particularly, if there is only one screw-shaped guide edge 2*c* on the piston to be tested, the distance between the pin 4 and the measurement point on the cross-sectional plane of the testing cylinder must be adapted correspondingly.

The invention is thus not limited to the embodiment presented, but various modifications are conceivable within the appended claims.

The invention claimed is:

1. A method of testing the piston of an injection pump of a pressure medium, the piston comprising a longitudinal groove that begins from the frontal face thereof and extends on the side, and a screw-shaped guide edge that abuts on the envelope surface of the piston, wherein the piston is inserted, with its frontal face first, into a testing cylinder, wherein the clearance between the piston and the testing cylinder is tight and wherein a specific testing pressure is exerted on the envelope surface of the piston, in a limited area, from the vicinity of the guide edge to a selected measurement point; that the piston is moved in the testing cylinder, so that the measurement point moves, following the guide edge; and that the changes in the testing pressure are monitored to observe any failures in the piston and the guide edge.

2. The method according to claim 1, wherein the clearance between the piston and the testing cylinder is in the order of a few thousandths of a millimeter.

3. The method according to claim 1, wherein the testing is initiated from the vicinity of a transversal surface related to the end that is opposite to the frontal face of the guide edge, wherein a reference value is taken to monitor the changes in the testing pressure.

4. The method according to claim 3, wherein feeding a steady testing pressure is continued, and the pressure values of the respective measurement point are compared with the reference value, whereby a specific drop in the pressure values of the pressure gauge that is connected to the feeding, compared with the reference value, e.g., 0.2 bar or more, indicates a failure in the guide edge.

5. The method according to claim 1, wherein air is used as a testing medium and the testing pressure is in the order of 3-4 bar.

6. The method according to claim 1, wherein for the testing, the piston is rotated and, at the same time, a force in the axial direction of the piston is exerted on its frontal face, and that, in the testing cylinder, a counterforce to the said axial force is arranged, being supported by the guide edge.

7. A testing apparatus for testing the piston of an injection pump, the piston comprising a longitudinal groove that begins from the frontal face thereof and extends on the side, and a screw-shaped guide edge that abuts on the envelope surface of the piston the testing apparatus comprising:

a testing cylinder for receiving the piston, which is inserted with its frontal face first, a clearance between the testing cylinder and the piston being tight, a pressure medium feeding equipment provided on the testing cylinder for exerting a testing pressure on a limited area on the envelope surface of the piston, from the vicinity of the guide edge of the piston to a selected measurement point, pressure measuring instruments for monitoring the changes in the testing pressure to observe possible failures in the piston and said guide edge, and means for moving the piston in the testing cylinder, so that the said measurement point moves, following the guide edge.

8. The testing apparatus according to claim 7, wherein the clearance between the piston and the testing cylinder is in the order of a few thousandths of a millimeter.

9. The testing apparatus according to claim 7, wherein the pressure medium feeding equipment include means for keeping the feeding pressure as steady as possible.

10. The testing apparatus according to claim 7, wherein, for the testing, the piston is arranged to be rotated in the testing cylinder and, simultaneously, a force in the axial direction of the piston is arranged to be exerted on its frontal face, and that a counterforce to the said axial force is arranged in the testing cylinder, the counterforce being arranged to be supported by the said guide edge.

11. The testing apparatus according to claim 10, wherein, in the testing cylinder, there is a pin or the like in the radial direction, which extends to the piston to be tested and which is arranged to cooperate with the guide edge of the piston, so that the piston is arranged to be pushed against the said pin or the like by the intermediary of the guide edge.

12. The testing apparatus according to claim 11, wherein the pin or the like is situated, in the transversal direction of the testing cylinder, at a distance from the said measurement point, preferably on the opposite side of the testing cylinder.

13. The testing apparatus according to claim 11, wherein the pin or the like is situated, in the axial direction of the testing cylinder, somewhat farther from the frontal face of the piston to be tested than the said measurement point.

14. The testing apparatus according to claim 11, wherein the testing cylinder is provided with a separate boring, which is arranged on the same cross-sectional plane with the pin and which is situated next to the recess that is connected to the guide edge of the piston.

15. The testing apparatus according to claim 10, wherein the force that is exerted on the frontal face is provided pneumatically.

16. The testing apparatus according to claim 7, wherein air is used as a testing medium and the testing pressure is in the order of 3-4 bar.

* * * * *